United States Patent [19]
Holmberg

[11] Patent Number: 5,212,755
[45] Date of Patent: May 18, 1993

[54] ARMORED FIBER OPTIC CABLES

[75] Inventor: Gerald E. Holmberg, Quaker Hill, Conn.

[73] Assignee: The United States of America as represented by the Secretary of the Navy, Washington, D.C.

[21] Appl. No.: 896,633

[22] Filed: Jun. 10, 1992

[51] Int. Cl.$^5$ .............................................. G02B 6/44
[52] U.S. Cl. .................................... 385/107; 385/104
[58] Field of Search ............... 385/100, 102, 104, 107, 385/108, 109; 174/102 R, 107, 110 R

[56] References Cited

U.S. PATENT DOCUMENTS

| | | | |
|---|---|---|---|
| 4,645,298 | 2/1987 | Gartside, III | 385/106 |
| 4,720,164 | 1/1988 | Oestreich | 385/106 |
| 4,941,729 | 7/1990 | Hardin et al. | 385/107 |
| 4,971,420 | 11/1990 | Smith | 385/107 |

Primary Examiner—Frank Gonzalez
Attorney, Agent, or Firm—Michael J. McGowan; Prithvi C. Lall; Michael F. Oglo

[57] ABSTRACT

An armored fiber optic cable is disclosed having both fiber optics and armor wires located outside the cable core in position where the fiber optics experience low strain when the cable is under stress. In one embodiment, metal armor wires and optical fibers embedded in metal tubes are arrayed in one or more layers about and outside the cable core. In another embodiment, KEVLAR armor wires and optical fibers embedded within a hard composite shell are arrayed in one or more layers about and outside the cable core, and a layer of KEVLAR armor is provided surrounding the one or more layers. In each of the embodiments the strains that the fiber optics experience due to core stresses and due to core residual strain is materially reduced over the heretofore known armored fiber optic cables.

13 Claims, 1 Drawing Sheet

ARMORED FIBER OPTIC CABLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention is directed to the field of optics and more particularly, to a low-strain, armored, fiber optic cable.

(2) Description of the Prior Art

In the heretofore known armored fiber optic cables, two locations in the cable core have been used to provide protection for the fibers. One location is at the center of the cable core, where fibers may be helixed around a king wire in the center of the core or laid longitudinally in a metal tube which forms the center of the cable core. The second location is outside the center of but still within the cable core, where the fiber is helixed around the core and either protected in an interstice between electrical connectors or contained in a helixed metal tube near the center of the cable core. When such an armored cable is stressed, the cable core undergoes a larger strain than the armor. To reduce strain on optical fibers located in the cable core, they are commonly stranded at a high angle with respect to the cable axis, but the higher the helix angle, the smaller the radius the fiber experiences in the cable core. For small radii, bend-induced optical attenuation may result. Another adverse effect of the heretofore known armored optical fiber cables arises when the cable is first worked, in that a residual construction strain appears in the cable core due to cable elongation when the armor wires set themselves into the cable core jacket. This residual strain undesirably remains in the cable core after initial use.

SUMMARY OF THE INVENTION

In accord with the principal object of the present invention, an armored fiber optic cable is disclosed having both fiber optics and armor wires located outside the cable core in a position where the fiber optics experience low strain when the cable is under stress. In one embodiment, metal armor wires, and fiber optics embedded in metal tubes, are arrayed in one or more layers about the cable core. In another embodiment, armor wires of aramid fiber such as KEVLAR, and fiber optics embedded within a hard composite shell, are arrayed in one or more layers about the cable core, and a layer of KEVLAR armor wire is provided surrounding the one or more layers. The hard composite shell is preferably a reinforced matrix, reinforced with KEVLAR filaments. The KEVLAR armor wire preferably is embedded within the same hard composite shell. In each of the embodiments the strains that the fiber optics experience due to core stresses and due to core residual strain is materially reduced over the heretofore known armored fiber optic cables.

BRIEF DESCRIPTION OF THE DRAWINGS

These and other objects advantages and features of the present invention will become apparent to those skilled in the art upon reference to the following description of the preferred embodiments and to the drawings, wherein.

DESCRIPTION OF THE PREFERRED EMBODIMENTS

Figure 1:
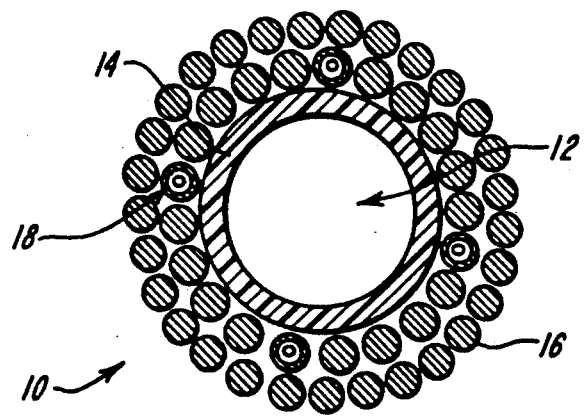
FIG. 1 shows a cross-section of a steel-armored, low-strain fiber optic cable in accord with the instant invention.
Figure 2:
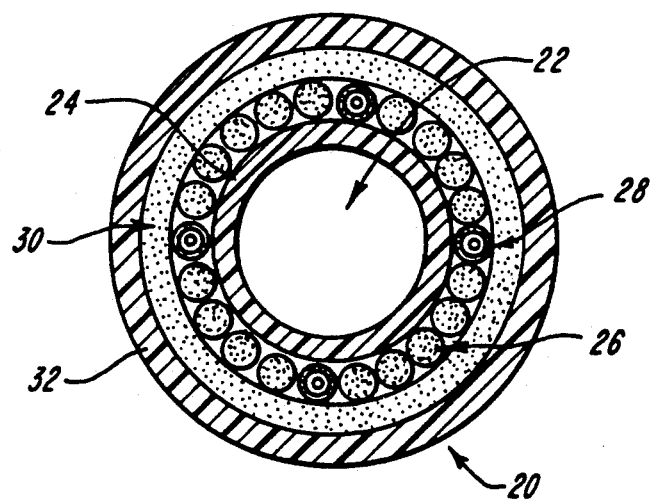
FIG. 2 shows a cross-section of a KEVLAR armored, low-strain fiber optic cable in accord with the instant invention.

Referring now to FIG. 1, generally shown at 10 is a cross-section of a steel-armored, low-strain fiber optic cable in accordance with the present invention. The cable 10 is made up of a cable core generally designated 12, which may contain electrical conductors, a core jacket 14, such as one adapted to prevent water intrusion into the cable core, armor wires 16, arrayed in one or more layers, and fiber optics embedded in metal tubes generally designated 18 interspersed among the one or more layers of armor wires 16, and preferably in the innermost layers thereof to protect the fiber optic cables. The cable 10 may also have another jacket, not shown, such as of polyethylene or of polyurethane, over the outside of the outermost layers. The wires 16 are preferably filaments of galvanized improved plow steel (GIPS), although as will readily be appreciated by those skilled in the art, other metals and metal alloys and other materials can be employed. The optical fibers are preferably embedded in stainless steel tubes, and preferably are K-tubes commercially available from the Armor Tech Division of K-Tube Corporation. To manufacture the members 18, a strip of stainless steel or other suitable metal is rolled to a circular shape and the longitudinal seam is laser welded, and swaged to size. A fiber optic cable is inserted into the tube as it is being formed, and the tube is injected with a gel during swaging. The size of the members 18 is preferably selected to be of a size that preferably approximates or is slightly smaller than the size of the armor wires 16, so that they can be stranded onto the cable at the same time as the armor wires. It is desirable that back-twisting of the fiber-bearing tubes 18 be controlled during stranding so that they will lay untwisted in the final cable. For a torque-balanced cable with, for example, two contrahelically wound layers of armor wires, it is desirable for the fiber-bearing tubes 18 to be in the inner layer, where the tubes are protected when the cable is passed over sheaves. Special care should be taken where the armor is terminated to a body, such as in a tow cable application, so that the fiber-bearing tubes are not crushed at the termination point. For an underwater application, the fiber optics would then penetrate a pressure-tight housing. Such pressure penetrations are routinely done with fiber optics, using, for example, an epoxy or a gland seal. Referring now to FIG. 2, generally shown at 20 is a cross-section of a KEVLAR armored, low-strain fiber optic cable armored with KEVLAR or other suitable high strength synthetic material in accordance with the present invention. The cable 20 contains a cable core generally designated 22, which may contain electrical conductors, a core jacket 24, such as of polyethylene, to protect the core 22 against undesirable water seepage, one or more layers of KEVLAR armor wires generally designated 26 interspersed with optical fibers embedded within a KEVLAR reinforced matrix generally designated 28, a layer of KEVLAR armor constituted as plural KEVLAR filaments generally designated 30, and a cable jacket 32. The armor wires 26 are preferably constituted as a group of KEVLAR filaments or fiber glass filaments or other synthetic material that are stabilized into a cylindrical shape. The filaments of the wires 26 may or may not be helically wound. Whenever they are helically wrapped, the filaments of the layer 30 are preferably contrahelically wrapped. The armor wires 28 containing fiber optics are preferably constructed by applying a hard reinforced matrix cylindrical shell over a jacketed fiber optic cable, the reinforcement preferably being of the same material as the armor wires. While KEVLAR is the presently preferred material, other synthetic materials or fiberglass can be employed as well. The jacket serves to cushion the fiber optic cable from external perturbations, and the hard reinforced matrix shell further shields the fiber from external influence. In the preferred embodiment, the hard shell of reinforced matrix within which the fiber optics are embedded is fabricated using either a thermal-cured epoxy or a uv-cured epoxy. Filaments of the KEVLAR or other synthetic material, which may be helically wrapped, are drawn through an epoxy bath along with one or more fiber optic cables and passed through a cylindrical forming dye. The epoxy, which may be, for example, a thermally cured or a uv cured epoxy, is then hardened in an oven or by uv-light, forming thereby the members 28. The process may be repeated in a repeat step to form a second layer which is also cured. The armor wires 26 are preferably similarly formed, but as will be appreciated by those skilled in the art, the fiber optic cable is omitted in forming the members 26, which may also be helically wrapped. It is preferred that the fibers used in the armored fiber bearing wires to be of the same material as that of the armor wires so that the fiber-bearing wires will have the same mechanical properties as the armor wires during cabling in the armor package. Layers of armor wires with interspersed fiber-bearing wires alternated with layers of KEVLAR filaments promotes cushioning of the fiber-bearing wires. For a torque-balanced cable with two contrahelically-wound layers of KEVLAR armor, it is desirable for the fiber-bearing wires to be o the inner layer so that they will be shielded from direct contact with sheaves, and it is further desirable to torsionally pre-distort them to compensate for their final helically wound geometry. Special attention should be given to fiber-bearing wires during armor termination, and, among other things, it may be necessary to add additional local composite material to each wire near the termination point. Many modifications of the present invention will become apparent to those skilled in the art without departing from the inventive concept.

What is claimed is:

1. A low-strain armored fiber optic cable, comprising:
a core having an interior;
a jacket concentric with the core defining an annular region between the jacket and core that is radially spaced from and outside the interior of the core;
a plurality of armor wires about the core in the annular region and defining at least one radially located layer circumferentially concentric with the spaced from said interior of the core; and
a plurality of armored fiber optic cables about the core in the annular region interspaced with the armor wires in at least one of each said at least one radially located layer;
said armor wires being of a synthetic material and wherein said armored fiber optic cables being fiber optic cables embedded within a composite material.

2. The invention of claim 1, wherein said composite material is a reinforced composite material.

3. The invention of claim 2, wherein said reinforced composite material includes an epoxy.

4. The invention of claim 2, wherein said reinforced composite material is reinforced by filaments of said synthetic material.

5. The invention of claim 1, wherein said synthetic material is KEVLAR.

6. The invention of claim 1, wherein said synthetic material is fiber glass.

7. The invention of claim 5, wherein said composite material is a reinforced epoxy composite material reinforced with KEVLAR.

8. The invention of claim 6, wherein said composite material is a reinforced epoxy composite material reinforced with fiber glass.

9. The invention of claim 1, further including a sheath of filaments of synthetic material circumferentially surrounding at least one of said at least one radially located layers.

10. The invention of claim 1, wherein said armor wires are constituted as plural filaments of synthetic material embedded within a hard shell generally having a circular cross-section.

11. The invention of claim 10, wherein said fiber optic cables embedded within a composite material are constituted as plural filaments of synthetic material, at least one fiber optic cable, and an adhesive.

12. The invention of claim 11, wherein said adhesive is an epoxy.

13. The invention of claim 11, wherein said plural filaments are helically wrapped with said at least one fiber optic cable.

* * * * *